| United States Patent [19] | [11] Patent Number: 5,523,127 |
|---|---|
| Ohnishi et al. | [45] Date of Patent: Jun. 4, 1996 |

[54] LIQUID CRYSTAL COMPOSITE LAYER OF THE DISPERSION TYPE, METHOD FOR THE PRODUCTION THEREOF AND LIQUID CRYSTAL MATERIALS USED THEREIN

[75] Inventors: Noriaki Ohnishi, Osaka; Toshiyuki Hirai, Ichinomotocho; Nobuaki Yamada, Osaka; Shiuchi Kozaki, Ukyo, all of Japan; David Coates, Merley; Emma J. Brown, Southborne, both of Great Britain; Bernhart Rieger, Müster-Altheim, Germany; Yukiomi Tanaka, Tsumada nishi, Japan

[73] Assignees: Merck Patent Gesellschaft mit beschrankter Haftung, Darmstadt, Germany; Sharp Corporation, Osaka, Japan

[21] Appl. No.: 75,116

[22] Filed: Jun. 10, 1993

[30] Foreign Application Priority Data

Jun. 10, 1992 [JP] Japan .................... 4-150473
Jun. 10, 1992 [JP] Japan .................... 4-150475
Jun. 10, 1992 [JP] Japan .................... 4-150476

[51] Int. Cl.$^6$ .................................... C09K 19/52
[52] U.S. Cl. ............... 428/1; 252/299.01; 252/299.64; 252/299.65; 252/299.66; 252/299.67
[58] Field of Search ............ 428/1; 252/299.01, 252/299.61, 299.64, 299.66, 299.68, 299.65, 299.67

[56] References Cited

U.S. PATENT DOCUMENTS

| 5,013,476 | 5/1991 | Boller | 252/299.64 |
| 5,124,183 | 6/1992 | Nakano | 428/1 |
| 5,401,437 | 3/1995 | Im | 252/299.01 |

*Primary Examiner*—Nasser Ahmad
*Attorney, Agent, or Firm*—Millen, White, Zelano, & Branigan

[57] ABSTRACT

The present invention relates to a liquid crystal composite layer of the polymer dispersion type wherein a liquid crystal material comprising compounds of formulae (1) and (2) is dispersed in a matrix polymer; wherein formula (1) is:

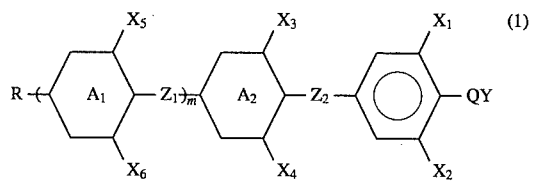

wherein $A_1$ and $A_2$ each represent independently a benzene ring, cyclohexane ring, pyrimidine ring or trans-1,3-dioxane ring;

$X_1$, $X_2$, $X_3$, $X_4$, $X_5$ and $X_6$ each independently represent H, F or Cl;

$Z_1$ and $Z_2$ each independently represent a single bond, —$CH_2$—, —$CH_2CH_2$—, —CH=CH—, —C≡C—, —COO— or —OCO—;

Q represents a single bond, —$CH_2$—, —$CH_2CH_2$—, —$CF_2$—, —$OCF_2$, —$C_2F_4$—, —$CCl_2$— or —$C_2Cl_4$—;

Y represents H, F or Cl;

R represents $C_nH_{2n+1}O$—, $C_nH_{2n+1}CH=CH$— (n=2–10);

m represents 0, 1 or 2;

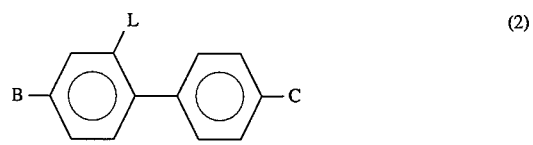

in which B and C represent respectively $C_nH_{2n+1}$—, $C_nH_{2n+1}O$—, $C_nH_{2n+1}CH=CH$— or $C_nH_{2n+1}$—$C_6H_{10}$— (n=2–10), and L is H or F.

18 Claims, 1 Drawing Sheet

LIQUID CRYSTAL COMPOSITE LAYER OF THE DISPERSION TYPE, METHOD FOR THE PRODUCTION THEREOF AND LIQUID CRYSTAL MATERIALS USED THEREIN

FIELD OF THE INVENTION

The present invention relates to a liquid crystal composite layer of the polymer dispersion type, more specifically, to a liquid crystal composite layer of the polymer dispersion type to which a display mode is applied by altering the difference between the refractive indexes of liquid crystal droplets (or continuous liquid crystal droplets) and the polymer and altering the orientation of the liquid crystal material by means of an external voltage so as to control light scattering at the liquid crystal/polymer interface.

The present invention furthermore refers to a method for the production of said liquid crystal composite layers and liquid crystal materials to be used therein.

The liquid crystal composite layer of the polymer dispersion type of the present invention can be applied to a planar display apparatus such as projection television or personal computer, a display plate to which shuttering effects are applied, a window, a door or a wall.

BACKGROUND OF THE INVENTION

Display devices of the TN type and STN type in which an electro-optical effect is applied to a nematic liquid crystal material have been put into practical use. Display devices comprised of a liquid crystal material having strong dielectric characteristics have also been proposed. These devices require a polarized light filter and an orientation treatment. On the other hand, the dynamic scattering effect and phase transition effect can be employed to provide a liquid crystal device in which a polarized light filter is not required and the liquid crystal material is dispersed.

Recently, it has been proposed that the refractive index of liquid crystal materials be electrically controlled to provide transparent conditions and white-cloudy conditions, so that a polarized light filter and an orientation treatment are not required. In this method, when voltage is applied, the orientation of liquid crystals corresponds to the direction of the electrical field and the refractive index of liquid crystals with an ordinary ray is made to correspond to the refractive index of a polymer medium, so that transparent conditions are formed. The light scattering conditions caused from the irregular orientation of liquid crystal molecules are formed when no voltage is applied.

This method is proposed, for example, in Japanese Patent Laid-Open Sho 58-501,631 in which liquid crystals are incorporated in polymer capsules, in Japanese Patent Laid-Open Sho 61-502,128 in which liquid crystal material and light-curable or heat-curable material are mixed and cured under phase separation to form liquid crystal droplets, and in Japanese Patent Laid-Open Sho 59-226,322 in which a solvent is removed from a mixture of polymer and liquid crystal, both of which are dissolved in the solvent, to form phase-separated conditions of polymer/liquid crystals.

The liquid crystal materials used in the invention which are related to those of the references are ones having a —CN group at the terminal end of the molecular structure, such as cyano biphenyl compounds and cyano pyrimidines. Such liquid crystal materials are disclosed in Japanese Patent Laid-Open Hei 2-272,422 to 2-272,424, 2-75,688 and 2-85, 822.

However, the liquid crystal compounds having a —CN group at the terminal end which are conventionally used for preparing the liquid crystal display devices of the polymer dispersion type have high reactivity and tend to attract impurities in the system because of strong polarization of the —CN group. Therefore, a liquid crystal display device of the polymer dispersion type having high charge holding characteristics (90% or more) cannot be provided through conventional production processes because the liquid crystal materials are often brought into contact with the other materials. In the present application, the term "charge holding characteristics" means voltage holding ratio as is defined, for example, by S. Matsumoto et al., Liq. Cryst. 5, 1320 (1989).

In particular, in methods wherein curable compounds are cured from a mixture thereof with liquid crystal compounds so as to separate liquid crystal materials from the cured materials, the liquid crystal materials are sometimes partly damaged during the curing process. This occurs because both the liquid crystal compounds and polymerizable active compounds exist together in one cell and the liquid crystal compounds are highly reactive. Therefore, resultant liquid crystal devices sometimes exhibit poor charge holding characteristics, which is especially true in cases where the liquid crystal mixture is based on compounds with a terminal cyano group, Schiff's base LC compounds, and the like.

On the other hand, it may be thought that in order to get rid of hysteresis, a photocurable resin of low surface interaction can be added. However, because such a resin has a different SP value (solubility parameter, see below) from that of conventional liquid crystals, the resins and the liquid crystals are not soluble in each other, so that they can not be put to practical use.

In methods wherein liquid crystals and photo curable resins are mixed uniformly and then phase-separated by photopolymerization, there includes a step of mixing the liquid crystal materials with the photocurable resins. Therefore, when the compatibility between the liquid crystal materials and the resins is poor, it is necessary to raise the mixing temperature in order to form a uniform LC and resin mixture. When photopolymerization is carried out at such a high temperature to separate phases, the polymerization speed becomes high, so that the phase separation is started in nearly isotropic phase conditions. Therefore, the dispersed particles of liquid crystal material become small and as a result, high driving voltage is required.

The present invention has been achieved in consideration of the above circumstances.

An object of the present invention is to provide a liquid crystal composite layer of the polymer dispersion type which can meet all the most important requirements for the liquid crystal display devices of the polymer dispersion type, i.e., low driving voltage, high contrast and high charge holding characteristics.

Another object of the present invention is to provide a liquid crystal optical device comprised of a liquid crystal composite layer of the polymer dispersion type.

Another object of the present invention is to provide a liquid crystal material which does not exhibit the shortcomings of conventional materials based on compounds with a terminal cyano group and does not undergo degradation or degradation only to an acceptable degree when preparing the liquid crystal composite layer of the present invention via photopolymerization.

Another object of the present invention is to provide a method for preparing said liquid crystal composite layer.

Upon further study of the specification and appended claims, further objects and advantages of this invention will become apparent to those skilled in the art.

SUMMARY OF THE INVENTION

The present invention relates to a liquid crystal composite layer of the polymer dispersion type, which comprises (a) a liquid crystal material, comprising compounds selected from the group consisting of compounds represented by formulae (1) and (2) below, dispersed in (b) a matrix polymer;

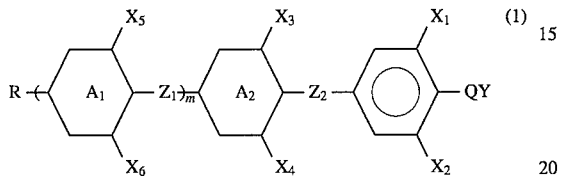

wherein $A_1$ and $A_2$ each independently represent a benzene ring, cyclohexane ring, pyrimidine ring or trans-1,3-dioxane ring;

$X_1$, $X_2$, $X_3$, $X_4$, $X_5$ and $X_6$ each independently represent H, F or Cl;

$Z_1$ and $Z_2$ each independent represent a single bond, —$CH_2CH_2$—, —CH=CH—, —C≡C—, —COO— or —OCO—;

Q represents a single bond, —$CH_2$—, —$CH_2CH_2$—, —$CF_2$—, —$OCF_2$, —$C_2F_4$—, —$CCl_2$— or —$C_2Cl_4$—;

Y represents H, F or Cl;

R represents $C_nH_{2n+1}$—, $C_nH_{2n+1}$O—, $C_nH_{2n+1}$CH=CH— (in which n is an integer of 2–10);

m represents 0, 1 or 2;

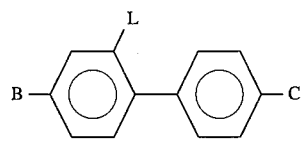

in which

B and C each independently represent $C_nH_{2n+1}$—, $C_nH_{2n+1}$O—, $C_nH_{2n+1}$CH=CH— or $C_nH_{2n+1}$—$C_6H_{10}$— (in which n is an integer of 2–10), and L is H or F.

The invention furthermore relates to a liquid crystal material comprising compounds selected from the group consisting of compounds represented by chemical formula (1) and compounds represented by chemical formula (2) in an amount of from 50–100 weight percent.

The invention furthermore relates to a method for the production of a liquid crystal composite layer of the polymer dispersion type, in which phases of liquid crystals are separated from a solution or a mixture of;

(a) a liquid crystal material comprising compounds selected from the group consisting of compounds represented by formula (1) and compounds represented by formula (2) in an amount of from 50–100 weight percent, and (b) a matrix polymer and, optionally, (c) a common solvent of the liquid crystal material and the matrix polymer.

The invention furthermore relates to the method for the production of a liquid crystal composite layer of the polymer dispersion type, in which (a) a liquid crystal material comprising compounds selected from the group consisting of compounds represented by formula (1) and compounds represented by formula (2) in an amount of 50–100 weight percent, is mixed uniformly with (b) a radical photopolymerizable resin material having an average solubility parameter (SP) value of 8–11 and an average molecular weight (Mn) of 100–1000, followed by phase separation of the liquid crystal material by photopolymerization of the polymerizable resin material.

Figure 1:
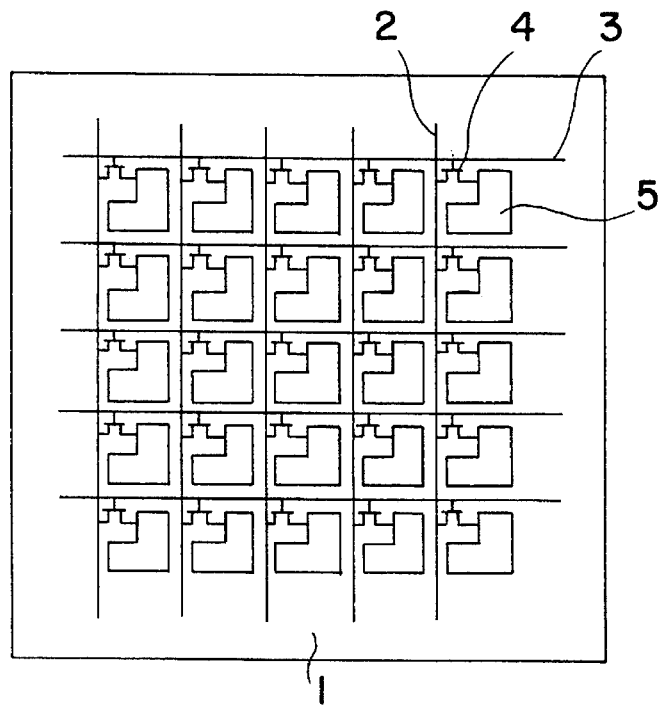
FIG. 1: A plain schematic view of an embodiment of a liquid crystal display device wherein a liquid crystal composite layer of the polymer dispersion type of the present invention can be employed.

Explanation of reference numbers:
1. first transparent insulating substrate
2. signal line
3. scanning line
4. switching transistor
5. pixel (picture element) electrode for display
6. second transparent insulating substrate
7. counter electrode
8. liquid crystal layer
9. seal
10. driving circuit
11. transistor (FET; $V_S$, $V_G$ and $V_d$ are source, gain and drain, voltages, respectively)
12. operational amplifier
13. recorder
14. pixel (picture element) of the liquid crystal cell

DETAILED DESCRIPTION OF THE INVENTION

The liquid crystal compounds of the chemical formula (1) have particularly excellent chemical stability. Liquid crystal materials/mixtures become more stable as more of these compounds are contained therein. But, when the liquid crystal materials are composed only of the compounds of formula (1), anisotropy of the refractive index (Δn), which is closely related to contrast of a liquid crystal display device of the polymer dispersion type, can become low. In order to give high anisotropy of the refractive index (Δn) to the liquid crystal materials, the liquid crystal compounds represented by the chemical formula (2) are added. These compounds of chemical formula (2) are excellent in chemical stability, do not have highly polar groups and provide high anisotropy of the refractive index (Δn). However, the compounds of chemical formula (2) wherein both B and C are dielectrically neutral terminal groups tend to increase the melting point and lower the dielectrical anisotropy so that the quantity of the liquid crystal compounds of formula (2) is preferably 30% by weight or less, based on the total amount of liquid crystal materials.

In the present invention, other liquid crystal compounds may be added to the mixture. In this case, the quantity of liquid crystal compounds of formulae (1) and (2) is adjusted to 50–100% by weight, preferably 70–100% by weight based on the total amount of liquid crystal materials in order to prevent deterioration of the charge holding characteristics of a liquid crystal display device of the polymer dispersion type.

Further, the compounds represented by the formulas (1) and (2) are preferably at a ratio (formula (1):formula (2)) of 100:0 to 70:30, more preferably 100:0 to 80:20 and, in particular, 100:0 to 95:5.

Conventional liquid crystal compounds such as cyano biphenyl compounds and cyano pyrimidines can be used as liquid crystal compounds with the liquid crystal compounds for formulas (1) and (2).

The liquid crystal materials used should be purified sufficiently so that the liquid crystal materials may have a specific resistance of $10^{12}$ $\Omega$cm or more, preferably $10^{13}$ $\Omega$cm after preparation of the liquid crystal materials.

Among the compounds represented by formula (1), the anisotropy of refractive index ($\Delta$n) becomes higher with an increase in the number of rings (N) in particular when the number of aromatic rings like 1,4-phenylene or other aromatic rings are increased.

But, when compounds having a number of rings (N) equal to 4 or more are used, the clearing point of the overall liquid crystal is made so high that processing characteristics are deteriorated and TCN (phase transition point of crystallization point-nematic point) is raised. Therefore, the mixing ratio needs to be adjusted so that a suitable temperature range for the nematic phase may be obtained.

On the other hand, since the compounds having the number of rings (N) equal to 2 or less make anisotropy of the refractive index ($\Delta$n) low, these compounds cannot be added in large amounts. Accordingly, preferred liquid crystal mixtures contain compounds having three rings, in particular three benzene rings and/or cyclohexane rings, in the molecular structure among the compounds represented by the formulas (1) and (2) at a content of 60% by weight or more, preferably 80% by weight.

The compounds according to formulae (1) and (2) are prepared by methods which are known per se, such as are described in the literature, for example, in the standard works, such as Houben-Weyl, Methoden der Organischen Chemie [Method of Organic Chemistry], Georg Thieme Verlag, Stuttgart, and in particular under reaction conditions which are known and suitable for the reactions mentioned. Variants which are known per se and are not mentioned in more detail here, can also be used in this connection.

Further, cholesteric liquid crystals, dopants, dichroic dyes and other desired additives may be added so long as the chemical stability of liquid crystal materials of the present invention is not deteriorated.

For example, the adequate addition of cholesteric liquid crystals makes it possible to control selective reflection, transparency and scattering conditions of light corresponding to spiral pitches by an ON-OFF electric field when the cholesteric liquid crystals have spiral pitches equal to those of visible light.

When dichroic dyes having a dichroic ratio of at least of 5, preferably 6 or more and a maximum absorbing wavelength of visible light of 500 nm or more are dispersed, the lowering of light scattering ability can be restrained in the range of long wavelengths and a liquid crystal composite layer of the polymer dispersion type excellent in contrast in all visible wavelength regions can be formed. The compensation resulting from the absorbing effects of dichroic dyes makes it possible to improve the light scattering ability in all visible light regions. The dichroism means characteristics which show anisotropy when a pigment molecule absorbs visible light in major axis direction and minor axis direction. When the dichroic ratio is positive, the molecule has a large transition moment of light absorbance in the major axis direction of the molecule. A dichroism pigment is a pigment which shows the characteristics as mentioned above.

A dichroic dye may be selected from conventional ones having characteristics as mentioned above. In certain embodiments, merocyanines, anthraquinones, styrenes, azobenzenes may be selected.

An additive amount of the dichroic dye is within the range of 0.5%–10%, preferably 1%–5% by weight based on the weight of liquid crystal materials. A pigment may be used not only to apply the light absorbing effects to the improvement of the contrast but also to apply pigment effects to improve color quality.

The liquid crystal composite materials according to the present invention can be prepared according to known techniques.

For example, there can be used a method in which liquid crystal materials and photo-curable or heat-curable resin materials are mixed followed by phase-separation and forming of liquid crystal droplets in a polymer matrix, or a method in which a solvent is removed from a mixture of polymer and liquid crystal materials both of which are dissolved in the solvent to form separated phases of polymer/liquid crystals. Among these methods, the present invention is a particularly effective method in which (a) a liquid crystal material comprising compounds selected from the group consisting of compounds represented by chemical formulae (1) and (2) in an amount of 50–100 percent by weight, is uniformly mixed with (b) a radical photopolymerizable resin material having an average solubility parameter (SP) value of 8–11 and an average molecular weight (Mn) of 100–1000, followed by phase separation of the liquid crystal material by photopolymerization of the polymerizable resin material.

The term "radical photopolymerizable resin materials" as used herein means a photopolymerizable mixture of compounds selected from monofunctional monomers, polyfunctional monomers and oligomers thereof. The polymerizable resin materials meets the specified SP (Solubility Parameter) value and molecular weight as described below. The mixing ratio of monomer components with oligomer components is important in determining the temperature of compatibility thereof with liquid crystal materials.

Preferred resin materials have a chemical formula (solubility parameter value (SP)) matching that of the above liquid crystal materials. If the SP value of the resin materials is much different from that of liquid crystal materials, the compatibility of the liquid crystal materials with the resin material becomes poor, so that the mixing temperature must be raised to obtain uniform conditions. When phase separations are induced by photopolymerization at high temperature, the rate of polymerization increases, so that the phase separation is started in nearly isotropic phase conditions. Therefore, the droplets of liquid crystal materials become small and as a result, high driving voltage is required. Preferable SP values for the radical photopolymerizable resin is 8–11, more preferably 9–10 because the liquid crystal materials above mentioned have SP values of about 9.5.

The SP value in the present invention is calculated according to the following formula generally known as Fedors method:

$$\delta = \sqrt{(\Sigma \Delta_{ei}/\Sigma \Delta_{vi})}$$

in which $\Delta_{ei}$ represents evaporation energy of atoms or atomic groups and $\Delta_{vi}$ represents molar volume of atoms or atomic groups.

When several kinds of resins are used in combination, the SP value of the mixed resins is defined via the following formula:

$$\delta = (X_1 \cdot \delta_1 + x_2 \cdot \delta_2 + X_3 \cdot \delta_3 + \ldots + X_n \cdot \delta_n)/100$$

in which $X_n$ represents one of % by weight of a resin component and $\delta_n$ represents one of a SP value of the resin component.

The molecular weight of radical photopolymerizable resin materials has important influences on the temperature for mixing uniformly liquid crystal materials with resin materials. For example, in the case of photopolymerizable oligomers, differences in molecular weight have almost no influence on the SP value. However, the enthalpy of the molecule becomes small as the molecular weight becomes large. As a result, the solubility thereof in liquid crystal materials becomes too low requiring the temperature for forming a uniform mixture to be raised. Therefore, a molecular weight of polymerizable resin materials is preferably within the range of 100–1000. If the molecular weight is less than 100, the following problems are brought about; the ratio of monofunctional monomers becomes so high that resin materials are not cured sufficiently; polymerizable resin materials have such a high a vapor pressure that it becomes difficult to pour the materials into a cell under vacuum and toxicity becomes so high that industrial production thereof becomes difficult. If the average molecular weight is more than 1000, a temperature for forming the isotropic phase with liquid crystals becomes so high that it is inevitable that the polymerization rate increases. As a result, the particle size of the liquid crystals formed in dispersion becomes so small that a high driving voltage is required. More preferably, the average molecular weight is within the range of 150–300.

The molecular weight ($M_0$) given for the oligomers in the present invention means average molecular weight obtained by means of gel permeation chromatography on the basis of standard poly-(methyl methacrylate) (PMMA) of the mono-dispersion type.

The average molecular weight of a mixture of compounds having different chemical structures is defined by the following formula:

$$M = (X_1 \cdot M_1 + X_2 \cdot M_2 + X_3 \cdot M_3 + \ldots + X_n \cdot M_n)/100$$

in which $X_n$ represents a % by weight of resin component and $M_n$ represents an average molecular weight of single component itself before mixing.

In particular, monofunctional monomers are contained in polymerizable resin materials at a content 60–98%, preferably 80–90%. If the content is less than 60%, the following problems are brought about. The molecular weight of polymerizable resin materials are increased, so that the compatible temperatures for liquid crystals and resin materials are raised. Moreover, polyfunctional monomers accelerate the speed of phase separation of liquid crystal molecules/polymers because the polyfunctional monomers effect great growth of a crosslinked structure. If the content of polyfunctional monomer is more than 98%, a polymer matrix having sufficient strength cannot be formed. The particle size of the liquid crystal dispersions becomes very large because a sufficient phase separation rate cannot be obtained. Accordingly, the contrast of a resultant cell is remarkably deteriorated.

The content of the polyfunctional monomers is within the range of 5–25% by weight, preferably 8–15% by weight, most preferably about 10% by weight.

The content of the oligomers is within the range of 5–20% by weight, preferably 8–15% by weight.

With respect to monomers constituting polymerizable resin materials, acrylic acids and acrylates may be the ones having alkyl groups or benzene rings in which the benzene rings, the alkyl groups (straight or branched) or hydrogen atoms are substituted partially or entirely with halogen atoms such as fluorine and chlorine.

More particularly, monofunctional monomers are exemplified by isobutyl acrylate, stearyl acrylate, lauryl acrylate, isoamyl acrylate, n-butyl methacrylate, n-lauryl acrylate, tridecyl methacrylate, n-stearyl methacrylate, cyclohexyl methacrylate, benzyl methacrylate, 2-ethylhexyl acrylate, 2-phenoxyethyl methacrylate, bisphenol-A-dimethacrylate, and bis-phenol-A-diacrylate.

Polyfunctional monomers work to improve the physical strength of polymer and are exemplified by dimethacrylate of 1,4-butane-diol, dimethacrylate of 1,6-hexanediol, trimethacrylate of trimethylolpropane, triacrylate of trimethylolpropane and tetra-acrylate or tetramethylolmethane.

It is more preferable that the monomers mentioned above are fluorinated or chlorinated. These halogenated compounds reduce the interaction at the interface between liquid crystal materials and resins and effectively get rid of hysteresis. The content of the fluorinated or chlorinated monomers is preferably 0.1–50% by weight of the total polymerizable resin materials. If the content is less than 0.1% by weight, the effect on reducing hysteresis is small. The addition of more than 50% by weight is not practical because the temperature for compatibility becomes high on account of the large difference in SP values between the halogenated monomers and the other monomers. Fluorinated or chlorinated compounds are exemplified by 2,2,3,4,4,4-hexafluorobutyl methacrylate, 2,2,3,4,4,4-hexachlorobutyl methacrylate, 2,2,3,3-tetrafluoropropyl methacrylate, perfluorooctylethyl methacrylate, perchlorooctylethyl methacrylate, perfluorooctylethyl acrylate, and perchlorooctylethyl acrylate.

Oligomers are exemplified by urethane-acrylate and poly-(oxy-ethylene-acrylate).

In the preparation of liquid crystal composite layers of the dispersion type, liquid crystal materials, radical photopolymerizable resin materials, photopolymerization initiators and other desired additives are mixed uniformly at a specified content to prepare prepolymers. In this case, the content of the liquid crystal materials is within the range of 95–60% by weight, preferably 90–80% by weight based on the weight of the photopolymerizable resin materials.

With respect to the photopolymerization initiators, conventional ones may be used. The content of photopolymerization initiators is preferably within the range of (1–5%) by weight, preferably (2–4%) by weight based on the weight of the photopolymerizable resin materials.

The other desired additives which may be added are exemplified by solvents.

Prepolymers (which may contain a solvent) used for production of a liquid crystal display device of a polymer dispersion type should be highly purified because of the direct contact thereof with liquid crystal materials. In particular, non-reacted materials, synthetic catalysts, decomposition products of the prepolymers and water are sufficiently removed. More specifically, the prepolymer is purified to have a resistance value of $10^{11}$ Ωcm or more, preferable $10^{12}$ Ωcm or more, so that best use of the characteristics of the present invention can be made.

A liquid crystal composite layer of the polymer dispersion type is prepared by pouring the polymer into a desired cell or device, followed by irradiation for photopolymerization of radical photopolymerizable resin to separate phases of liquid crystal materials from the resins.

The conditions for photopolymerizable are typically as follows:

kind of light: high pressure mercury lamp strength of light: 30–50 mW/cm² irradiation time: 60 seconds

The polymer dispersion type liquid crystal composite layer of the present invention can further be prepared by applying a mixed solution of a liquid crystal material and a matrix polymer having optically uniform characteristics in a common solvent by a casting method and then drying to form separated phases of the liquid crystals in the matrix polymer. A liquid crystal panel of a polymer dispersion type prepared as mentioned above has relatively excellent charge holding characteristics at high voltage and stability, because the liquid crystal material is highly stable and the production process of the composite layer of liquid crystal/polymer does not accompany chemical reaction. Especially large display panels can be prepared by this method.

A method of this type has been recently reported in Polymer preprints Japan, vol. 37, No. 8 (1988), Japanese Patent Laid Open Sho 59-226322 and Japanese Patent Laid Open Hei 1-250,925. According to these references, a polymer and a liquid crystal material are dissolved in a solvent, the solution obtained is applied on a transparent plate by a casting method and dried and then a counter transparent electrode is laminated to form a liquid crystal panel. According to this method, the composite layer obtained is comprised of matrix polymer having spongy constitution and liquid crystals which fill the pores of the polymer in spherical forms or continuous forms.

This method of preparing the liquid crystal-polymer composite layer is advantageous in that a chemical reaction is not accompanied in the process of phase separation so that a large display can be formed. Often these advantages can not be obtained in a preparation method in which phase separation is carried out by a heat polymerization or light polymerization method in a uniform solution containing thermosetting monomers, photopolymerizing monomers and liquid crystal materials, unless liquid crystal materials and radical photopolymerizable resin materials are properly and carefully adjusted to each other as was described above.

Matrix polymers used for production of a liquid crystal composite layer of the polymer dispersion type should be highly purified because of the direct contact thereof with liquid crystals, have high uniformity and have excellent transparency. More specifically, the matrix polymer is adjusted to have a resistance value of $10^{12}$ Ωcm or more, preferably $10^{13}$ Ωcm or more, so that best use of the characteristics of liquid crystal materials of the present invention can be made.

The operating mode of a display device comprised of a liquid crystal composite layer of the polymer dispersion type changes with the response of refractive index of liquid crystals dispersed in the matrix polymer to an electrical field. Light transmittable conditions in which the refractive index is almost equal to that of matrix polymer ($n_p$) and light scattering conditions in which refractive indices of liquid crystal/matrix polymer are not in harmony are controlled. Therefore, it is desirable to select a matrix polymer having a refractive index ($n_p$) which is related with the refractive index of liquid crystal material ($n_o$) with an ordinary ray by the formula:

$$|n_o - n_p| < 0.2$$

A matrix polymer may be selected from the ones satisfying the characteristics mentioned above and being soluble in a solvent. Such a polymer is exemplified by synthetic resins, synthetic rubbers or natural rubbers such as vinyl chloride resins, carbonate resins, methycrylate resins, fluorine resins, silicone resins, acrylic resins, styrene resins, vinyl resins and hydrolized compounds thereof, nitrile resins, amide resins.

In preparation of a liquid crystal composite layer of the polymer dispersion type, the weight ratio of liquid crystal material:matrix polymer is adjusted within the range of 95:5–30:70, preferably 90:10–60:40 so that the light-transmittance may be made as small as possible when no voltage is applied and that the contrast may be made high.

A common solvent for the liquid crystal material and matrix polymer is exemplified by chloroform, etc.

The specific choice of the solvent and the coating and drying conditions depends on each liquid crystal and resin material and can be optimized by an expert without any inventive effort.

Figure 2:
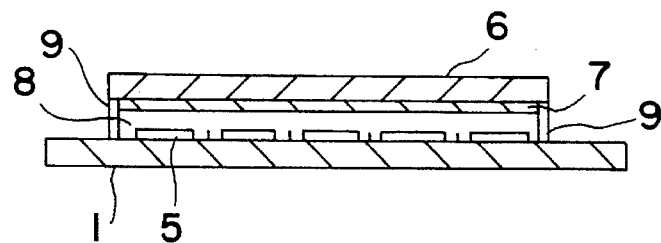
FIG. 2: A sectional schematic view of an embodiment of the liquid crystal display device.

A liquid crystal composite layer of the polymer dispersion type of the present invention may be used in, for example, a liquid crystal display device as shown in FIG. 1 and FIG. 2. The liquid crystal composite layer of polymer dispersion type (8) is interposed as a liquid crystal layer between an electrode for display and a counter electrode in the device. A pixel (picture element) electrode (5), a switching transistor (4) matching to the electrode (5) and path lines such as a signal line (2) and a scanning line (3) are arranged in a matrix form on a transparent and insulating substrate (1) made of glass having no birefringence to give a display electrode substrate for an active matrix driving system. As the switching transistor (4), an a-Si thin film transistor (TFT) is formed. The counter electrode (7) is formed on a transparent insulating substrate (6) made of a glass oppositely to each pixel (picture element) electrode (5). The picture element electrode (5) and the counter electrode (7) are transparent electrodes for applying voltage to the liquid crystal layer (8). The liquid crystal layer (8) is sealed with a seal (9) made of epoxy resin.

The present invention is explained by particular examples hereinafter. The scope of the invention, however, is not limited by the specific examples.

According to the present invention, the use of chemically stable liquid crystal compounds of the F and Cl series improves the charge holding characteristics which are the most serious problem in liquid crystal display devices of the polymer dispersion type.

Liquid crystal materials of the present invention can provide a liquid crystal display device of the polymer dispersion type.

According to the present invention, the combination of chemically stable liquid crystal compounds of the F and Cl series with carefully chosen polymerizable resin materials suitable for the liquid crystal material or with a matrix polymer (typically in a common solvent), can provide a liquid crystal display device of the polymer dispersion type having improved charge holding characteristics (which was the most significant problem in liquid crystal display devices of the polymer dispersion type) and display excellent characteristics in low driving voltage, high contrast, low hysteresis and high reliability.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

The entire disclosures of all applications, patents and publications, cited above and below, and of corresponding application 150473/1992, 150475/1992 and 150746/1992, are hereby incorporated by reference.

EXAMPLE 1

Liquid crystal material A of 2 g shown in Table 1 was mixed with poly(methycrylate) (PMMA) (Derupet (trade name); made by Asahi Kasei Kogyo K.K.) of 0.5 g. The obtained mixture was dissolved uniformly in chloroform as a common solvent to give a solution of solute content of 15 wt %. The uniform solution was applied by a bar-coat method onto ITO glass (on the surface of which indium oxide and tin oxide were deposited) (FLINT GLASS with ITO of 500 Å made by Nippon Ita Glass K.K.) so that a uniform composite layer of liquid crystal/polymer of 13–15 μm might be formed after drying. Then, a counter electrode made of transparent glass with electrically conductive layer thereon, was laminated. Then, the polymer composite layer was sealed. Thus, a liquid crystal display cell of polymer dispersion type was obtained.

TABLE 1

| composition of liquid crystal material | content (%) |
| --- | --- |
| $C_2H_5$—⟨⟩—⟨⟩—$C_2H_4$—⟨⟩—Cl (F) | 20 |
| $C_3H_7$—⟨⟩—⟨⟩—$C_2H_4$—⟨⟩—Cl (F) | 20 |
| $C_5H_{11}$—⟨⟩—⟨⟩—$C_2H_4$—⟨⟩—Cl (F) | 20 |
| $C_3H_7$—⟨⟩—⟨⟩—⟨⟩—F (F) | 15 |
| $C_5H_{11}$—⟨⟩—⟨⟩—⟨⟩—F (F) | 15 |
| $C_3H_7$—⟨⟩—⟨⟩—⟨⟩—$C_2H_5$ | 5 |
| $C_5H_{11}$—⟨⟩—⟨⟩—⟨⟩—$C_2H_5$ | 5 |
| clearing point (centigrade) | 94 |

TABLE 1-continued

| composition of liquid crystal material | content (%) |
| --- | --- |
| anisotropy of refractive index | 0.1944 |

Figure 3:
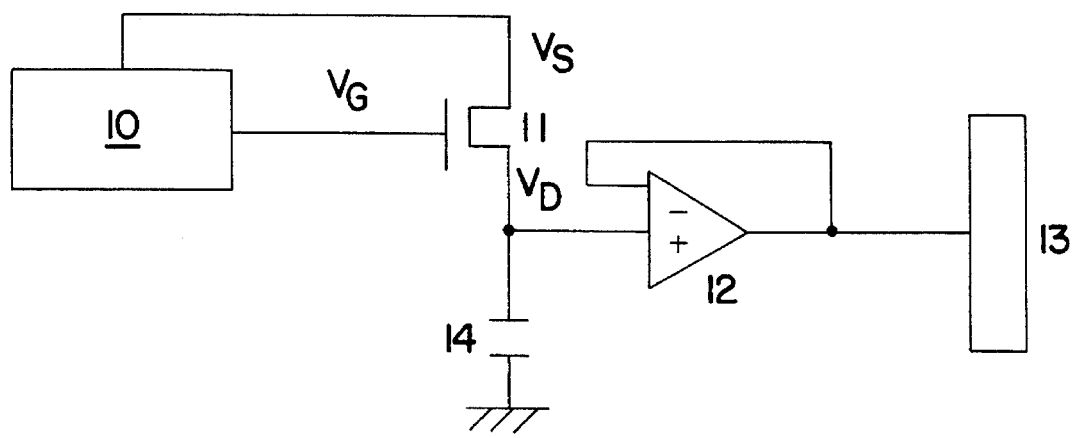
FIG. 3: Is a schematic representation of a circuit for measuring charge holding characteristics.

Charge holding characteristics of the resultant cell were measured by means of a system for measuring the charge holding characteristics shown in FIG. 3. The system is constituted of a switching transistor (FET, 11) which works to apply voltage to electrodes, a driving circuit (10) and a circuit for measuring discharge of electrical charges (13) in the cell (14). The charge holding characteristics were measured at room temperature. The results are shown in Table 4.

Threshold voltage (Vth) and saturated voltage (Vs) were measured as electro-optic characteristics of the prepared cell. The threshold voltage (Vth) means the value of voltage at the time when light transmittance is increased by 10% on the basis of the difference between saturated light transmittance (Ts) and light transmittance (To) when no voltage is applied. Light transmittance (Ts) or ($T_{100}$) means the value at the time when saturation voltage is applied to the cell. Light transmittance (To) means the value an the time when no voltage is applied to the cell. The cell displayed Vth of 6.2 V and Vs of 8.1 V. The driving voltage was very low when compared with that of conventional cells and response characteristics were excellent.

The prepared cell had transmittance of light of direct view of 3.5% at no voltage and 79.1% at 50 V of alternating voltage applied when collecting angle is 6° at light receiving portion. Contrast was excellent.

EXAMPLE 2, 3 AND COMPARATIVE EXAMPLES 1, 2

Liquid crystal display devices of polymer dispersion type were prepared in a manner similar to that of Example 1, except that liquid crystal material B shown in Table 2 (Example 2), liquid crystal material C shown in Table 3 (Example 3), liquid crystals of cyano biphenyl compounds (made by E. Merck, Germany; Comparative Example 1), E44 (made by E. Merck, Germany; Comparative Example 2) were used instead of the liquid crystal material A in Example 1.

Charge holding characteristics of the obtained cells were measured in a manner similar to that of Example 1. The results are shown in Table 4 (see below of Example 4).

TABLE 2

| composition of liquid crystal material | content (%) |
| --- | --- |
| $C_3H_7$—⟨⟩—⟨⟩—⟨⟩—F (F, F, F) | 5 |
| $C_5H_{11}$—⟨⟩—⟨⟩—⟨⟩—F (F, F, F) | 5 |
| $C_2H_5$—⟨⟩—⟨⟩—$C_2H_4$—⟨⟩—Cl (F) | 15 |

TABLE 2-continued

| composition of liquid crystal material | content (%) |
|---|---|
| C$_3$H$_7$–[Ph(F)]–[Ph]–C$_2$H$_4$–[Ph]–Cl | 15 |
| C$_5$H$_{11}$–[Ph(F)]–[Ph]–C$_2$H$_4$–[Ph]–Cl | 15 |
| C$_3$H$_7$–[Cy]–[Ph]–[Ph(F,F)] | 13 |
| C$_5$H$_{11}$–[Cy]–[Ph]–[Ph(F,F)] | 13 |
| C$_5$H$_{11}$–[Cy]–[Ph]–[Ph]–C$_2$H$_5$ | 5 |
| C$_3$H$_7$–[Cy]–[Ph]–[Ph]–C$_2$H$_5$ | 5 |
| C$_3$H$_7$–[Cy]–[Ph]–[Ph]–[Cy]–C$_3$H$_7$ | 3 |
| C$_5$H$_{11}$–[Cy]–[Ph]–[Ph]–[Cy]–C$_3$H$_7$ | 3 |
| C$_5$H$_{11}$–[Cy]–[Ph]–[Ph]–[Cy]–C$_5$H$_{11}$ | 3 |
| clearing point (centigrade) | 110 |
| anisotropy of refractive index | 0.1739 |

TABLE 3

| composition of liquid crystal material | content (%) |
|---|---|
| C$_5$H$_{11}$–[Cy]–[Ph]–F | 5 |
| C$_7$H$_{15}$–[Cy]–[Ph]–F | 6 |
| C$_3$H$_7$–[Cy]–[Ph(F,F)]–[Ph(F,F)] | 6 |
| C$_5$H$_{11}$–[Cy]–[Ph(F,F)]–[Ph(F,F)] | 6 |
| C$_3$H$_7$–[Ph(F)]–[Ph]–C$_2$H$_4$–[Ph]–Cl | 12 |
| C$_5$H$_{11}$–[Ph(F)]–[Ph]–C$_2$H$_4$–[Ph]–Cl | 18 |
| C$_3$H$_7$–[Cy]–[Ph]–[Ph(F,F)]–F | 12 |
| C$_5$H$_{11}$–[Cy]–[Ph]–[Ph(F,F)]–F | 12 |
| C$_3$H$_7$–[Cy]–[Ph]–[Ph]–C$_2$H$_5$ | 5 |
| C$_5$H$_{11}$–[Cy]–[Ph]–[Ph]–C$_2$H$_5$ | 5 |
| C$_5$H$_{11}$–[Cy]–[Ph]–[Ph]–C$_9$H$_{19}$ | 4 |
| C$_3$H$_7$–[Cy]–[Ph]–[Ph]–[Cy]–C$_3$H$_7$ | 3 |
| C$_5$H$_{11}$–[Cy]–[Ph]–[Ph]–[Cy]–C$_3$H$_7$ | 3 |
| C$_5$H$_{11}$–[Cy]–[Ph]–[Ph]–[Cy]–C$_5$H$_{11}$ | 3 |
| clearing point (centigrade) | 99 |
| anisotropy of refractive index | 0.1571 |

EXAMPLE 4

Dichroic dye D37 (anthraquinone type) (made by Merck Ltd., Great Britain) having maximum absorbing wavelength at 556 nm was further added at 3 wt % to the liquid crystal material in Example 1 to prepare a liquid crystal display device of polymer dispersion type in a manner similar to the above Examples and Comparative Examples.

The prepared cell was colored because visible lights are absorbed by the added dye. The prepared cell had transmittance of light of direct view of 3.0% at no voltage and 78.5% at 50 V of alternating voltage applied when collecting angle is 6° at light receiving portion. Contrast was somewhat improved further.

The charge holding characteristics were measured in a manner similar to Example 1. The results are shown in Table 4.

TABLE 4

| | keeping characteristics (%) | | | | |
|---|---|---|---|---|---|
| Ex. 1 | Ex. 2 | Ex. 3 | Ex. 4 | Com. Ex. 1 | Com. Ex. 2 |
| 98.6 | 98.4 | 98.7 | 92.5 | 82.1 | 83.8 |

EXAMPLE 5

Liquid crystal compounds of 2 g shown in Table 1 were added to resin mixture of 2-ethylhexyl acrylate of 0.4 g, diacrylate of neopentylglycol of 0.05 g and oligomer of urethane acrylates of 0.05 g. Further, photocuring agent (Irgacure 184; made by Ciba Geigy, Switzerland) of 0.02 g was mixed to give uniform solution at 40° C. A spacer was interposed to form a cell having 12 μm space between two plates of ITO glass (on the surface of which indium oxide and tin oxide were deposited) (FLINT GLASS with ITO of 500 Å made by Nippon Ita Glass K.K.). The mixture obtained above was poured into the cell. Then the cell was irradiated by high pressure mercury lamp at power of 30 mW/cm² (irradiation strength of ultraviolet of 365 nm) at room temperature for 2 minutes to cure resins.

Charge holding characteristics, threshold voltage ($V_{th}$), saturation voltage ($V_s$) and light transmittance $T_s$ respectively $T_o$ were measured as described in example 1.

The following results were obtained:

| | |
|---|---|
| Keeping characteristic (room temperature) | 98.2% |
| $V_{th}$ | 2.6 V |
| $V_s$ | 5.7 V |
| $T_o$ | 2% (0 V) |
| $T_s$ | 82.1% (50 V) |

EXAMPLES 6, 7 AND COMPARATIVE EXAMPLES 3, 4

Liquid crystal display devices of polymer dispersion type were prepared in a manner similar to that of Example 5, except that liquid crystal materials shown in Table 2 (see Example 2), liquid crystal materials shown in Table 3 (see Example 3), liquid crystals of cyano biphenyl compounds (made by E. Merck, Germany; Comparative Example 1), E44 (made by E. Merck, Germany; Comparative Example 2) were used.

Charge holding characteristics of the obtained cells were measured in a manner similar to that of Example 1. The results are shown in Table 5.

TABLE 5

| Charge holding characteristics (%) | | | | |
|---|---|---|---|---|
| Ex. 5 | Ex. 6 | Ex. 7 | Com. Ex. 3 | Com. Ex. 4 |
| 98.2 | 98.1 | 98.5 | 85.2 | 87.4 |

EXAMPLES 8, 9 AND 10

2-ethylhexyl acrylate (2EHA; SP value:8.6, average molecular weight (Mn):1984, specific resistance of liquid:1.2×10¹² Ωcm; made by Nippon Kayaku K.K.) and diacrylate monomer (R-684; SP value:10.3, average molecular weight (Mn):304, specific resistance of liquid: 2.1×10¹² Ωcm; made by Nippon Kayaku K.K.) were mixed at a ration as shown in Table 6 to give a radical photopolymerizable resin material. Average molecular weights and SP values of the prepared polymerizable resin material are also shown in Table 6.

TABLE 6

| Example No. | Content of 2EHA (% wt) | Content of R-684 (% wt) | SP value | Average Molecular Weight (Mn) |
|---|---|---|---|---|
| 8 | 93 | 7 | 8.74 | 192 |
| 9 | 90 | 10 | 8.79 | 196 |
| 10 | 80 | 20 | 8.96 | 208 |
| Com. Ex. 5 | 99 | 1 | 8.64 | 185 |
| Com. Ex. 6 | 50 | 50 | 9.46 | 244 |

TABLE 6-continued

| Example No. | Content of 2EHA (% wt) | Content of R-684 (% wt) | SP value | Average Molecular Weight (Mn) |
|---|---|---|---|---|
| Ex. 6 | | | | |

These polymerizable resin materials of 0.3 g, liquid crystal materials A (made by E. Merck, Germany) shown in Table 1 (see Example 1) of 1.2 g and photoinitiator (Irgacure 184; made by Ciba Geigy, Switzerland) of 0.045 g were mixed uniformly at 80° C.

A spacer was interposed to form a cell having 12 μm space between two plates of ITO glass (on the surface of which indium oxide and tin oxide were deposited) (FLINT GLASS with ITO of 500 Å made by Nippon Ira Glass K.K.). The mixture obtained above was poured into the cell. Then the cell was irradiated by low pressure mercury lamp at a power of 50 mW/cm² (irradiation strength of ultraviolet of 365 nm; UV illumination photometer UIT-101; made by Ushio Denki K.K.) at irradiation temperature of 15° C. for 20 seconds to polymerize and cure the resin materials. After UV irradiation, the cell was left for 2 hours at 50° C.

Charge holding characteristics, threshold voltage ($V_{th}$), saturation voltage ($V_s$) and values of light transmittance $T_s$ (50 V) ($T_s \equiv T_{100}$) respectively $T_o$ (0 V) were measured as described in Example 1.

The results are summarized in Table 7.

TABLE 7

| Example No. | Ex. 8 | Ex. 9 | Ex. 10 |
|---|---|---|---|
| Charge holding characteristics (%) | 97.5 | 98.2 | 97.7 |
| threshold voltage ($V_{th}$) | 2.3 | 2.7 | 6.5 |
| saturation voltage ($V_{sat}$) | 4.2 | 5.1 | 11.3 |
| light-transmittance ($T_o$) | 6.0 | 2.0 | 1.2 |
| light-transmittance ($T_{100}$) | 82.8 | 81.5 | 79.8 |
| temperature of UV irradiation (°C.) | 15 | 15 | 20 |

EXAMPLES 11, 12 AND COMPARATIVE EXAMPLES 5, 6

Liquid crystal display devices of polymer dispersion type were prepared in a manner similar to that of Example 8, except that liquid crystal materials B shown in Table 2 (see Example 2), liquid crystal materials C shown in Table 3 (see Example 3), liquid crystals of cyano biphenyl compounds (made by E. Merck, Germany; Comparative Example 1), E44 (made by E. Merck, Germany; Comparative Example 2) were used.

The charge holding characteristics of the obtained cells were measured in a manner similar to that of Example 1. The results are shown in Table 8.

TABLE 8

| Example No. | Ex. 11 | Ex. 12 | Com. Ex. 5 | Com. Ex. 6 |
|---|---|---|---|---|
| charge holding characteristics (%) | 96.6 | 97.5 | 85.1 | 83.8 |
| threshold voltage ($V_{th}$) | 5.8 | 3.1 | | |
| saturation voltage ($V_{sat}$) | 11.0 | 5.3 | | |
| light-transmittance ($T_o$) | 8.0 | 8.0 | | |
| light transmittance ($T_{100}$) | 82.3 | 84.4 | | |

TABLE 8-continued

| Example No. | Ex. 11 | Ex. 12 | Com. Ex. 5 | Com. Ex. 6 |
|---|---|---|---|---|
| temperature of UV irradiation (°C.) | 55 | 65 | | |

In Comparative Examples 5 and 6, polymerizable resin materials and liquid crystal materials were not mixed at low temperature and the compatible temperatures were 80° C. and 85° C. respectively. The light transmittance of the prepared cells were hardly changed at the application voltage of 50 V, and the charge holding ratio were 85.1% and 83.3% respectively. The cells can hardly be put into practical use.

COMPARATIVE EXAMPLE 7, 8

Liquid crystal display devices of polymer dispersion type were prepared in a manner similar to that of Example 8 except that resin materials having composition shown in Table 6 were prepared by use of the same compound as those of Example 8 and the liquid crystal material A (shown in Table 1) was used. The electro-optical characteristics of the obtained cells were shown in Table 9.

TABLE 9

| Example No. | Com. Ex. 7 | Com Ex. 8 |
|---|---|---|
| charge holding characteristics (%) | 98.1 | 97.3 |
| threshold voltage ($V_{th}$) | 2.5 | 24.4 |
| saturation voltage ($V_{sat}$) | 5.0 | 55.6 |
| light-transmittance ($T_o$) | 43.0 | 0.5 |
| light-transmittance ($T_{100}$) | 82.3 | 80.2 |
| temperature of UV irradiation (°C.) | 10 | 25 |

EXAMPLES 13, 14 AND 15

2-ethylhexyl acrylate (2EHA; SP value:8,6, average molecular weight (Mn):184; made by Nippon Kayaku K.K.) and diacrylate monomer (R-684; SP value:10.3, average molecular weight (Mn):304; made by Nippon Kayaku K.K.), oligomer of urethane acrylate (SP value:10.3, average molecular weight (Mn):1700, specific resistance of liquid:$1.5 \times 10^{12}$ Ωcm; made by Nippon Kayaku K.K.) were mixed at a ration as shown in Table 10 to give photopolymerizable resin materials. Average molecular weights and SP values of the prepared polymerizable resin materials are also shown in Table 10.

TABLE 10

| Example No. | Content of 2EHA (% wt) | Content of R-689 (% wt) | Content of oligomer (wt %) | SP value δ | Average Molecular Weight (Mn) |
|---|---|---|---|---|---|
| 13 | 93 | 5 | 2 | 8.74 | 220 |
| 14 | 90 | 7 | 3 | 8.79 | 235 |
| 15 | 80 | 14 | 6 | 8.96 | 292 |
| Com. Ex. 9 | 60 | 0 | 40* | 8.29 | 1110 |
| Com. Ex. 10 | 100 | 0 | 0 | 8.64 | 184 |

The mark "*" means that a compound having average molecular weight (M):2500 is used as an urethane acrylate oligomer.

Liquid crystal display devices of polymer dispersion type were prepared in a manner similar to that of Example 8 by use of the resin materials and the liquid crystal material A (shown in Table 1, see example 1). The electro-optical characteristics of the obtained cells are shown in Table 11.

TABLE 11

| Example No. | Ex. 13 | Ex. 14 | Ex. 15 |
|---|---|---|---|
| charge holding characteristics (%) | 98.2 | 96.8 | 97.3 |
| threshold voltage ($V_{th}$) | 2.6 | 3.7 | 7.5 |
| saturation voltage ($V_{sat}$) | 5.9 | 5.8 | 9.7 |
| light-transmittance ($T_o$) | 8.2 | 1.5 | 0.5 |
| light-transmittan ($T_{100}$) | 81.9 | 73.2 | 83.1 |
| temperature of UV irradiation (°C.) | 15 | 15 | 20 |

EXAMPLES 16, 17 AND 18

2-ethylhexyl acrylate (2EHA; SP value:8.6, average molecular weight (Mn):184; made by Nippon Kayaku K.K.), perfluorooctylethyl acrylate (FA-108; SP value:7.4, average molecular weight (Mn):574; made by Kyoeisa K.K.), diacrylate monomer (R-684; SP value:10.3, average molecular weight (Mn):304; made by Nippon Kayaku K.K.) and oligomer of urethane acrylate (SP value:10.3, average molecular weight (Mn):1700, specific resistance of liquid:$1.5 \times 10^{12}$ Ωcm; made by Nippon Kayaku K.K.) were mixed at a ratio as shown in Table 12 to give polymerizable resin materials. Average molecular weights and SP values of the prepared resin materials are also shown in Table 12.

TABLE 12

| Example No. | Content of 2EHA (% wt) | Content of R-689 (% wt) | Content of FA-108 (wt %) | SP value | Average Molecular Weight (Mn) |
|---|---|---|---|---|---|
| 16 | 72 | 20 | 8 | 8.84 | 240 |
| 17 | 64 | 20 | 16 | 8.75 | 253 |
| 18 | 54 | 20 | 26 | 8.63 | 301 |

Liquid crystal display devices of polymer dispersion type were prepared in a manner similar to that of Example 8 by use of the resin materials and the liquid crystal material A (shown in Table 1, see Example 1). The electro-optical characteristics of the obtained cells were measured in a manner similar to Example 1. The hysteresis was evaluated by measuring the difference of the voltage between half-tone voltage $V_{50}$ at voltage-decreasing time and $V_{50}$ at voltage increasing time. The $V_{50}$ means the halftone voltage at increasing/decreasing applied voltage.

TABLE 13

| Example No. | Ex. 16 | Ex. 17 | Ex. 18 |
|---|---|---|---|
| charge holding characteristics (%) | 96.1 | 95.2 | 94.5 |
| threshold voltage ($V_{th}$) | 4.5 | 3.7 | 3.4 |
| saturation voltage ($V_{sat}$) | 9.3 | 6.1 | 6.8 |
| hysteresos (Vh) (V) | 0.1 | >0.1 | >0.1 |
| light-transmittance ($T_o$) (%) | 1.0 | 2.2 | 4.5 |
| light-transmittance ($T_{100}$) (%) | 80.1 | 75.6 | 70.2 |
| temperature of UV irradiation (°C.) | 20 | 25 | 25 |

COMPARATIVE EXAMPLES 9 AND 10

Liquid crystal display devices of polymer dispersion type were prepared in a manner similar to that of Example 8, except that the compound having average molecular weight (Mn) of 2500 and the same repeating units as those of the oligomer urethane acrylate used in Examples 13, 14 and 15 was used in Comparative Example 9; 2EHA (100%) was used in Comparative Example 10 as a radical photopolymerizable resin material and the same liquid crystal materials as those of Example 1 (see table 1) were used in respective Comparative Examples. The composition of resin materials are shown in Table 10. The electro-optical characteristics of the obtained cells are shown in Table 14.

TABLE 14

| Example No. | Com. Ex. 9 | Com. Ex. 10 |
|---|---|---|
| charge holding characteristics (%) | 96.6 | 96.1 |
| threshold voltage ($V_{th}$) (V) | — | — |
| saturation voltage ($V_{sat}$) (V) | — | — |
| light-transmittance ($T_o$) (%) | 0.5 | 75.2 |
| light-transmittance ($T_{100}$) | 20.2 | 83.5 |
| temperature of UV irradiation (°C.) | 80 | 5 |

In Comparative Example 9, the saturation voltage was 50 V or more. In Comparative Example 10, resin materials were not cured sufficiently, so that sufficient contrast could not be achieved.

COMPARATIVE EXAMPLE 11

2-hydroxyethyl acrylate (Light Ester HOA; SP value:12.5; molecular weight (Mn); 116; made by Kyoeisya K.K.) was used instead of 2EHA used in Example 9 to be mixed with the liquid crystal material A (shown in Table 1, see Experiment 1). But, the both compounds were not mixed uniformly even at 80° C. So a cell could not be prepared. The composition of the resin material is shown in Table 15.

TABLE 15

| Comparative Example No. | Content of HOA (% wt) | Content of R-684 (% wt) | SP value | Average Molecular Weight (Mn) |
|---|---|---|---|---|
| 11 | 95 | 5 | 12.4 | 125 |

What is claimed is:

1. A liquid crystal composite layer which is a polymer dispersion, which comprises (a) a nematic liquid crystal material comprising compounds selected from the group consisting of compounds represented by formulae (1) and (2) dispersed in (b) a matrix polymer;

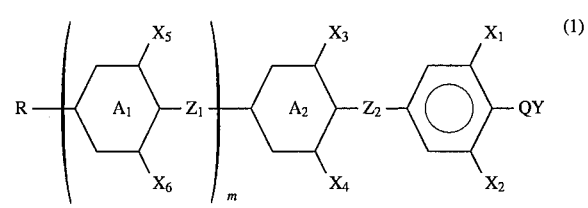

wherein $A_1$ and $A_2$ each independently represent a benzene ring, cyclohexane ring, pyrimidine ring or trans-1,3-dioxane ring;

$X_1$, $X_2$, $X_3$, $X_4$, $X_5$ and $X_6$ each independently represent H, F or Cl;

$Z_1$ and $Z_2$ each independently represent a single bond, —$CH_2$—, —$CH_2CH_2$—, —CH=CH—, —C≡C—, —COO— or —OCO—;

Q represents a single bond, —$CH_2$—, —$CH_2CH_2$—, —$CF_2$—, —$OCF_2$, —$C_2F_4$—, —$CCl_2$— or —$C_2Cl_4$—;

Y represents H, F or Cl;

R represents $C_nH_{2n+1}$—O—, $C_nH_{2n+1}$—, or $C_nH_{2n+1}$CH=CH—, in which n is an integer of 2–10;

m represents 0, 1 or 2;

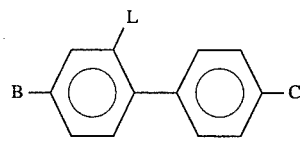

in which B and C represent respectively $C_nH_{2n+1}-$, $C_nH_{2n+1}O-$, $C_nH_{2n+1}CH=CH-$ or $C_nH_{2n+1}$-1,4-cyclohexylene-, in which n is an integer of 2–10, and L is H or F.

2. A liquid crystal composite layer of claim 1, in which the matrix polymer has an electrical resistance of $10^{12}$ Ωcm or more and the refractive index of the polymer matrix ($n_p$) is related to the refractive index of the liquid crystal material ($n_o$) with an ordinary ray by the formula:

$$|n_o - n_p| < 0.2$$

3. A liquid crystal composite layer of claim 1, in which the matrix polymer is mixed with the liquid crystal material at a weight ratio within the range between 10:90–40:60.

4. A liquid crystal composite layer of claim 1, further comprising a dichroic dye having maximum absorbing wavelength of visible light at 500 nm or more and a dichroic ratio of at least of 5.

5. A liquid crystal composite layer of claim 1, in which the liquid crystal material is dispersed in the matrix polymer by means of phase separation.

6. A nematic mixture of liquid crystal compounds comprising:
one or more compounds of formula (1) and one or more compounds of formula (2), wherein said compounds of formulae (1) and (2) amount to 50–100 percent by weight of said mixture;
wherein formula (1) is:

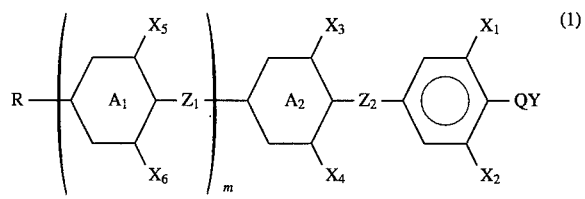

wherein
$A_1$ and $A_2$ each represent independently a benzene ring, cyclohexane ring, pyrimidine ring or trans-1,3-dioxane ring;
$X_1$, $X_2$, $X_3$, $X_4$,
$X_5$ and $X_6$ each independently represent H, F or Cl;
$Z_1$ and $Z_2$ each independently represent a single bond, $-CH_2-$, $-CH_2CH_2-$, $-CH=CH-$, $-C\equiv C-$, $-COO-$ or $-OCO-$;
Q represents a single bond, $-CH_2-$, $-CH_2CH_2-$, $-CF_2-$, $-OCF_2-$, $-C_2F_4-$, $-CCl_2-$ or $-C_2Cl_4-$;
Y represents H, F or Cl;

R represents $C_nH_{2n+1}-O-$, $C_nH_{2n+1}-$, $C_nH_{2n+1}CH=CH-$, in which n is an integer of 2–10;
m represents 0, 1 or 2;
wherein formula (2) is:

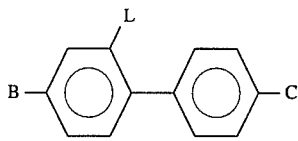

in which B and C represent respectively $C_nH_{2n+1}-$, $C_nH_{2n+1}O-$, $C_nH_{2n+1}CH=CH-$ or $C_nH_{2n+1}$-1,4-cyclohexylene-, in which n is an integer of 2–10, and L is H or F.

7. A liquid crystal mixture of claim 6, wherein the compounds represented by the formulae (1) and (2), having three rings wherein each ring is independently a benzene ring or a cyclohexane ring in the molecular structure, are present in an amount of 60–100 wt. %.

8. A liquid crystal mixture of claim 6, in which compounds represented by the formula (1) and the compounds represented by the formula (2) are preset in a ratio of 95:5–70:30 (formula (1) to formula (2)).

9. A liquid crystal display device, comprising the liquid crystal composite layer of the polymer dispersion described in claim 1 and interposed between two electrodes, at least one of which is transparent.

10. A liquid crystal composite layer according to claim 1, wherein 50–100% of said nematic liquid-crystal material is compounds of formulae (1) and (2).

11. A liquid crystal composite layer according to claim 1, wherein the amount of liquid-crystal compounds of formula (2) is 30% by weight or less of the total amount of liquid-crystal material.

12. A liquid crystal composite layer according to claim 1, wherein 70–100% of said nematic liquid-crystal material is compounds of formulae (1) and (2).

13. A liquid crystal composite layer according to claim 1, wherein said liquid-crystal material contains compounds of formulae (1) and (2) in a ratio of 99:1–70:30.

14. A liquid crystal composite layer according to claim 1, wherein said liquid-crystal material has a specific resistance of $10^{12}$ Ωcm or more.

15. A liquid crystal mixture according to claim 6, wherein the compounds represented by the formulae (1) and (2), having three rings wherein each ring is independently a benzene ring or a cyclohexane ring in the molecular structure, are present in an amount of 80–100 wt. %.

16. A liquid crystal composite layer according to claim 1, wherein said liquid-crystal material contains at least 10 wt. % of compounds of formula (2).

17. A liquid crystal mixture according to claim 6, wherein said liquid-crystal material contains at least 10 wt. % of compounds of formula (2).

18. A liquid crystal composite layer according to claim 4, wherein the amount of said dichroic dye is 0.5–10 wt. %, based on the weight of said liquid-crystal material.

* * * * *